No. 659,368. Patented Oct. 9, 1900.
J. E. & W. R. HABERLIN & T. F. HAYES.
TRUING GAGE.
(Application filed Jan. 3, 1900.)
(No Model.)
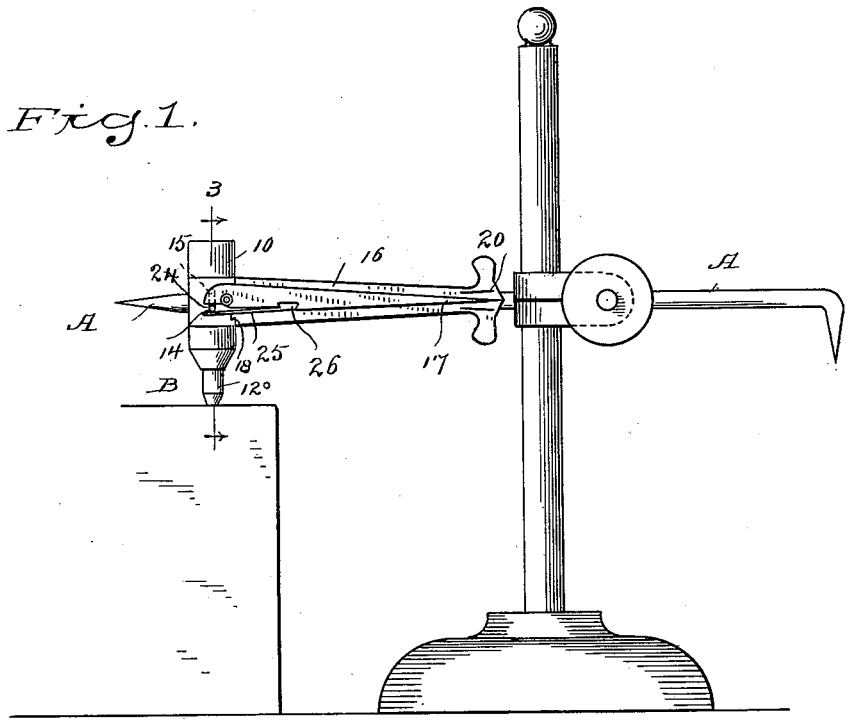
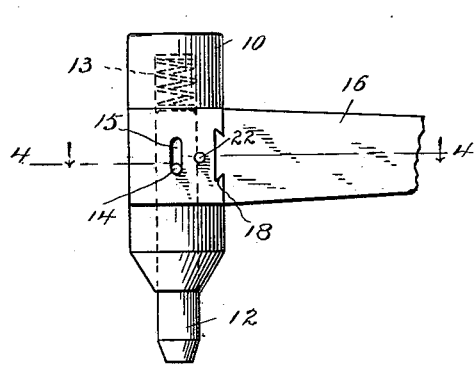
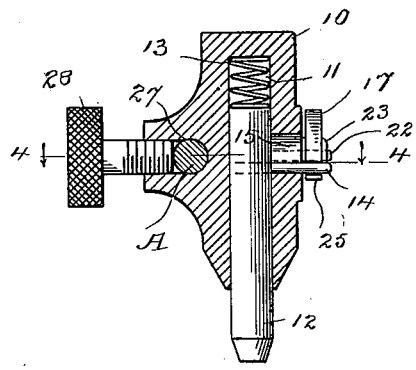
WITNESSES
INVENTORS

UNITED STATES PATENT OFFICE.

JOHN E. HABERLIN, WILLIAM R. HABERLIN, AND TIMOTHY F. HAYES, OF BRIDGEPORT, CONNECTICUT.

TRUING-GAGE.

SPECIFICATION forming part of Letters Patent No. 659,368, dated October 9, 1900.

Application filed January 3, 1900. Serial No. 216. (No model.)

*To all whom it may concern:*

Be it known that we, JOHN E. HABERLIN, WILLIAM R. HABERLIN, and TIMOTHY F. HAYES, citizens of the United States, residing at Bridgeport, county of Fairfield, State of Connecticut, have invented a new and useful Truing Gage, of which the following is a specification.

Our invention has for its object to provide a truing-gage which may be attached to any suitable arm—as, for example, the arm of an ordinary surface-gage—and which will enable an operator to produce a degree of fineness in high-grade work amounting to practically absolute accuracy. It is of course well understood that in many kinds of fine work—as, for example, in making the parts of check-punches and phonographs and in fine tool-making generally—one or two one-thousandths of an inch variation only is allowable, and in some instances even a smaller variation than that will cause work to be rejected. Our novel instrument, unlike other instruments of its class, renders tentative adjustments unnecessary, likewise the use of paper under the contact-point. Our novel instrument is moreover equally adapted for use on flat or round surfaces and will indicate the slightest variation from perfect flatness or from a perfectly-cylindrical contour or will indicate if a piece to be operated upon is in perfect alinement—that is, if it is centered with accuracy.

With the universal requirement for a relatively-inexpensive and practically-accurate instrument of this character in view we have devised the simple and novel indicator or gage which we will now describe, referring to the accompanying drawings, forming part of this specification, and using reference characters to indicate the several parts.

Figure 1 is an elevation showing our novel instrument in use and carried by an ordinary surface-gage; Fig. 2, an elevation of the instrument on an enlarged scale, the arm being partly broken away and the pointer removed; Fig. 3, a section on the line 3 3 in Fig. 1, and Fig. 4 is a section on the line 4 4 in Figs. 2 and 3.

10 denotes the body of our novel instrument, which is provided with a socket 11 to receive a plunger 12, which is forced forward by a spring 13, lying at the base of the socket. The movement of the plunger in either direction is limited by means of a pin 14, which passes through a slot 15 in the body and engages the plunger, the outer end of the pin extending outward from the body for engagement by the pointer, as will presently be explained. 16 denotes the arm, and 17 the pointer, both of which are made readily detachable from the body. We have shown the body as provided with an undercut groove 18, which is engaged by a correspondingly-shaped angle-piece 19, extending from the arm. At the outer end of the arm is a suitable scale 20—in the present instance three lines only, one of which is central to the other two—the pointer registering therewith when at its normal position. The pointer is provided at its inner end with a hole 21, which is adapted to engage a fixed pin 22, extending from the body contiguous to pin 14. This hole is preferably bushed by a sleeve 23, made longer than the thickness of the pointer in order to provide a longer bearing therefor. Pin 14, which extends from the plunger, engages a slot 24 in the base of the pointer. One wall of this slot preferably consists of a spring 25, which may be an integral part of the pointer, but which we have shown as made in a separate piece and secured to the pointer, as at 26. The action of this spring will be readily understood from Fig. 1. It insures that pin 14 will be gripped firmly and prevents the slightest lost motion between the pin and the pointer. The instrument may be attached in place for use in any suitable manner. We have shown the body as provided with a hole 27 to receive a suitable carrying-arm, which we have indicated by A, the carrying-arm illustrated in the present instance being, as already stated, the arm of an ordinary truing-gage. We wish it distinctly understood, however, that the carrying-arm or other device by which the instrument is supported in use is not of the essence of our invention and that any part adapted for the purpose may be used. In the present instance we have shown the body as provided with a set-screw 28, by which the instrument is locked in place to the carrying-arm.

The operation will be readily understood from the drawings. When not in use, the arm and pointer may be readily removed from the body and as readily replaced in position again when required. The instrument is secured to any suitable carrying-arm in position for use, the plunger being placed in engagement with the work, which we have indicated by B, as in Fig. 1, and the pointer being in alinement with the central line of the scale. It will be obvious that by moving the instrument along upon the work the vibration of the pointer will indicate the slightest variations from practical accuracy. In Fig. 1 the instrument is shown exact size, and the parts are so proportioned that a variation of three one-thousandths of an inch will move the pointer from the center line of the scale to one of the side lines, it being obvious that variations amounting to very much less than three one-thousandths of an inch will be readily made apparent by deflection of the pointer from the central line.

Having thus described our invention, we claim—

1. In an instrument of the character described, the combination with a body having a slot 15 and a fixed pin 22 and an arm extending from said body, of a plunger socketed in the body, a spring acting directly upon the plunger for forcing the latter forward, a pin 14 projecting from the plunger through the slot 15 and serving to limit the movement of the plunger, and a pointer pivoted on the pin 22 and having a slot engaged by the pin 14.

2. In an instrument of the character described, the combination with a body having a slot 15 and a fixed pin 22 and an arm extending from said body, of a plunger socketed in the body, a spring acting directly upon the plunger for forcing the latter forward, a pin 14 projecting from the plunger through the slot 15 and serving to limit the movement of the plunger, and a pointer pivoted on the pin 22 and having a slot 24 one wall of which consists of a spring, said slot being engaged by the pin 14.

In testimony whereof we affix our signatures in presence of two witnesses.

JOHN E. HABERLIN.
WILLIAM R. HABERLIN.
TIMOTHY F. HAYES.

Witnesses:
  A. M. WOOSTER,
  S. W. ATHERTON.